(12) United States Patent
Kim et al.

(10) Patent No.: US 7,647,914 B2
(45) Date of Patent: Jan. 19, 2010

(54) CONTROLLED PORT OXIDATION OF DIRECT INJECTION SPARK IGNITION ENGINES

(75) Inventors: Yong-Wha Kim, Ann Arbor, MI (US); Jeffrey Koncsol, Westland, MI (US); Julie Buckland, Dearborn, MI (US); Jing Sun, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 11/282,164

(22) Filed: Nov. 18, 2005

(65) Prior Publication Data

US 2007/0113822 A1   May 24, 2007

(51) Int. Cl.
*F02P 15/08* (2006.01)
(52) U.S. Cl. ............... 123/299; 123/305; 123/491; 123/636; 123/406.47; 123/406.53
(58) Field of Classification Search ............ 123/299, 123/300, 305, 491, 406.3, 406.47, 406.53, 123/636
See application file for complete search history.

(56) References Cited

U.S. PATENT DOCUMENTS

| | | | | |
|---|---|---|---|---|
| 4,208,992 A | * | 6/1980 | Polo | 123/406.51 |
| 4,428,349 A | * | 1/1984 | Snow | 123/493 |
| 5,404,860 A | * | 4/1995 | Morino | 123/605 |
| 5,806,483 A | * | 9/1998 | Mitarai et al. | 123/299 |
| 5,834,939 A | * | 11/1998 | Makhija | 324/402 |
| 5,868,115 A | * | 2/1999 | Fukui | 123/406.55 |
| 6,085,733 A | * | 7/2000 | Motoyama et al. | 123/636 |
| 6,145,482 A | * | 11/2000 | Blount | 123/45 A |
| 6,425,371 B2 | | 7/2002 | Majima | |
| 6,694,959 B1 | * | 2/2004 | Miwa et al. | 123/637 |
| 6,830,033 B2 | * | 12/2004 | Boerkel | 123/406.47 |
| 6,971,343 B2 | * | 12/2005 | Hitomi et al. | 123/58.8 |
| 7,252,069 B2 | * | 8/2007 | Date et al. | 123/299 |
| 7,404,396 B2 | * | 7/2008 | Toriyama et al. | 123/598 |
| 7,530,342 B2 | * | 5/2009 | Surnilla et al. | 123/299 |
| 2004/0020190 A1 | | 2/2004 | Yoshida | |
| 2004/0112318 A1 | * | 6/2004 | Wolfgang | 123/179.5 |
| 2004/0168671 A1 | | 9/2004 | Yamaguchi et al. | |

* cited by examiner

*Primary Examiner*—Hai H Huynh
(74) *Attorney, Agent, or Firm*—Allen J. Lippa; Alleman Hall McCoy Russell & Tuttle LLP (57) ABSTRACT

A system and method for operating an engine is disclosed. The system and method includes performing multiple ignitions during a single engine cycle. According to one embodiment, a first ignition takes place during a first stroke in the cycle and a second ignition takes place during a second stroke in the cycle. The system and method may further include performing multiple injections during the engine cycle.

15 Claims, 5 Drawing Sheets

CONTROLLED PORT OXIDATION OF DIRECT INJECTION SPARK IGNITION ENGINES

FIELD

The present application relates to a system and method for controlling engine operation to reduce feedgas emissions in direct injection spark ignition engines.

BACKGROUND AND SUMMARY

Direct injection spark ignition (DISI) engines offer opportunities in reducing $CO_2$ emissions and improving fuel economy. With potential for reduced pumping losses and improved thermal efficiency, the DISI engines, such as those capable of stratified charge combustion, can deliver improved fuel economy and with reduced emissions. Further, the additional degree of freedom in fuel delivery time in DISI engines can provide a mechanism for controlling exhaust temperature, such as during engine starting. On the other hand, DISI engines may generate higher feed-gas hydrocarbon emissions compared to conventional Port Fuel Injection (PFI) engines for both warmed-up steady state and cold start transient conditions.

In one particular approach using a DISI engine, a double injection may be combined with retarded spark timing to increase heat delivery during an engine start. In this way, more heat can be delivered to the catalyst and therefore shorten the catalyst light-off time and improve after treatment efficiency.

However, the inventors have recognized that the benefits from combining double injection with retarded spark timing are usually achieved at the expense of additional fuel economy and increased feed-gas hydrocarbon emissions. Thus, in some examples, even when using double injection with retarded spark, emission may still increase beyond a regulated value.

Thus, in one approach, a method for operating an engine having a four-stroke cycle including an intake stroke, a compression stroke, an expansion stroke, and an exhaust stroke, is provided. The method comprises: performing multiple ignitions during a single cycle, wherein a first ignition takes place during a first stroke in the cycle and a second ignition takes place during a second stroke in the cycle. Such operation may be performed during an engine cold start, for example, along with multiple injections (e.g., one injection during the first stroke and one during the second stroke), to increase exhaust gas heat while lowering emissions. In this way, it is possible to provide improved cold start up protocols that allow for the exploitation of the benefits of the DISI engines while minimizing emissions and optimizing system performance. Further, it is possible to improve engine robustness to low quality fuel during engine cold start performance.

In another approach, a method for optimizing port oxidation in an engine having a four-stroke cycle, including an intake stroke, a compression stroke, an expansion stroke, and an exhaust stroke is provided. The method comprises: performing a first pattern of multiple injections and at least one ignition during a first cycle; and performing a second pattern of multiple injections and multiple ignitions during a second cycle; where the first and second patterns are different.

In this way, appropriate ignition and injection modes can be selected for different operating conditions to improve operation overall across a plurality of different conditions. For example, in some cases, it may be desirable to burn as much fuel as possible in the cylinder, while in other cases it may be desirable to generate exothermic heat in the exhaust via excess reductants in the exhaust.

DETAILED DESCRIPTION

Figure 1:
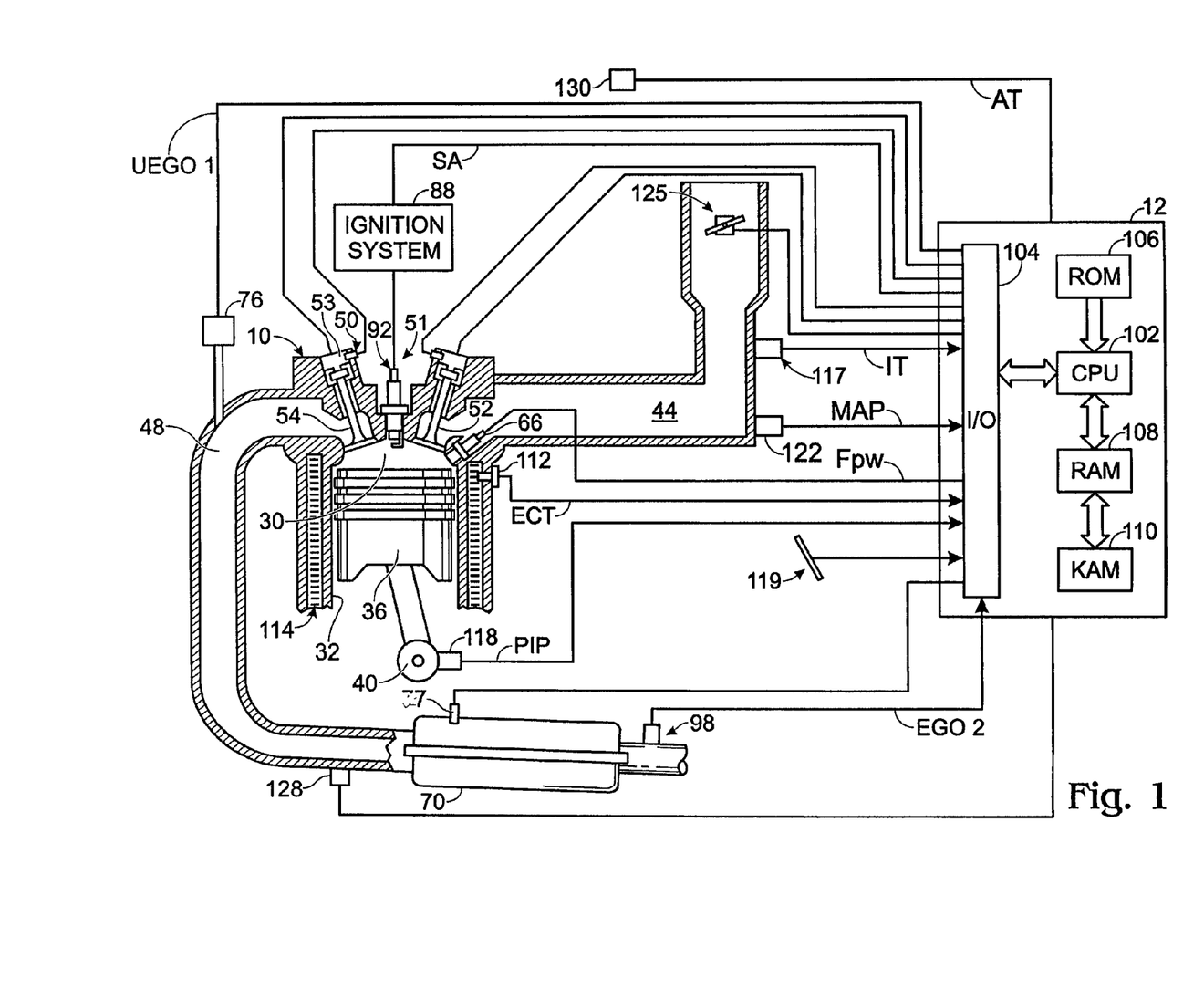
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by known means including, for example, a standard cam system. Alternatively, one or more of the intake and exhaust valves may be operated by an electromechanically controlled valve coil and armature assembly. Regardless of the operating means used, each valve actuator may include a position sensor 50 and a temperature sensor 51.

Intake manifold 44 is also shown coupled to the engine cylinder having fuel injector 66 coupled thereto for delivering liquid fuel in proportion to the pulse width of signal FPW from controller 12. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. In addition, intake manifold 44 is shown communicating with optional electronic throttle 125. In one example, a low pressure direction injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus.

Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of engine manifold pressure (MAP) from pressure sensor 122 coupled to intake manifold 44; a measurement of intake temperature (IT) or manifold temperature from temperature sensor 117; an engine position sensor from a Hall effect sensor 118 sensing crankshaft 40 position; a measurement of exhaust temperature (ET) from temperature sensor 128; and a measurement of ambient temperature (AT) from external temperature sensor 130. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to an open position so as to increase the volume within combustion chamber 30. The position at which piston 36 is at its most open position (i.e. when combustion chamber 30 is at its largest volume) is typically referred to by those of skill in the art as bottom dead center (BDC). During the compression stroke, intake valve 52 closes and piston 36 moves so as to compress the air within combustion chamber 30. The point at which piston 36 is at it most closed position (i.e. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the combustion forces piston 36 back to BDC. The crankshaft 40 converts this piston movement into a rotational torque of the rotary shaft. Finally, during the exhaust stroke, the exhaust valve 54 opens to release the burnt gas to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

The timing of events within the combustion chamber is typically referred to as taking place before or after TDC or BDC during a specific stroke. When an injection or ignition occurs while piston 36 is moving to a closed position, the injection or ignition may be referred to as having taken place before top dead center (BTDC) or after bottom dead center (ABDC). When an injection or ignition occurs while piston 36 is moving to an open position, the injection or ignition may be referred to as having taken place after top dead center (ATDC) or before bottom dead center (BBDC). The specific timing of events within the combustion chamber is typically referred to in terms of degrees of crankshaft rotation before or after TDC and/or degrees before or after BDC. For example, 45° after top dead center (ATDC) refers to the point at which the crankshaft has rotated 45° past the top dead center point. Thus, for example, an injection or ignition may be referred to as taking place at TDC, 10° BTDC, 10° ATDC, 20° BTDC, 20° ATDC, or the like.

An engine operation protocol utilizing various patterns of multiple injections and/or multiple ignitions is disclosed herein. According to one aspect of the disclosure, an appropriate injection/ignition strategy is selected according to current engine operating conditions in order to maximize port oxidation subject to combustion stability, while providing acceptable engine performance under warmed up operating conditions. This not only delivers the increased heat flux to the exhaust, but also reduces the hydrocarbon entering the inactive catalyst before it lights-off. According to the present disclosure, the currently described injection/ignition strategy offers increased flexibility. Specifically, injection can take place outside of the intake and compression strokes and ignition can take place outside of the expansion stroke.

Figure 2:
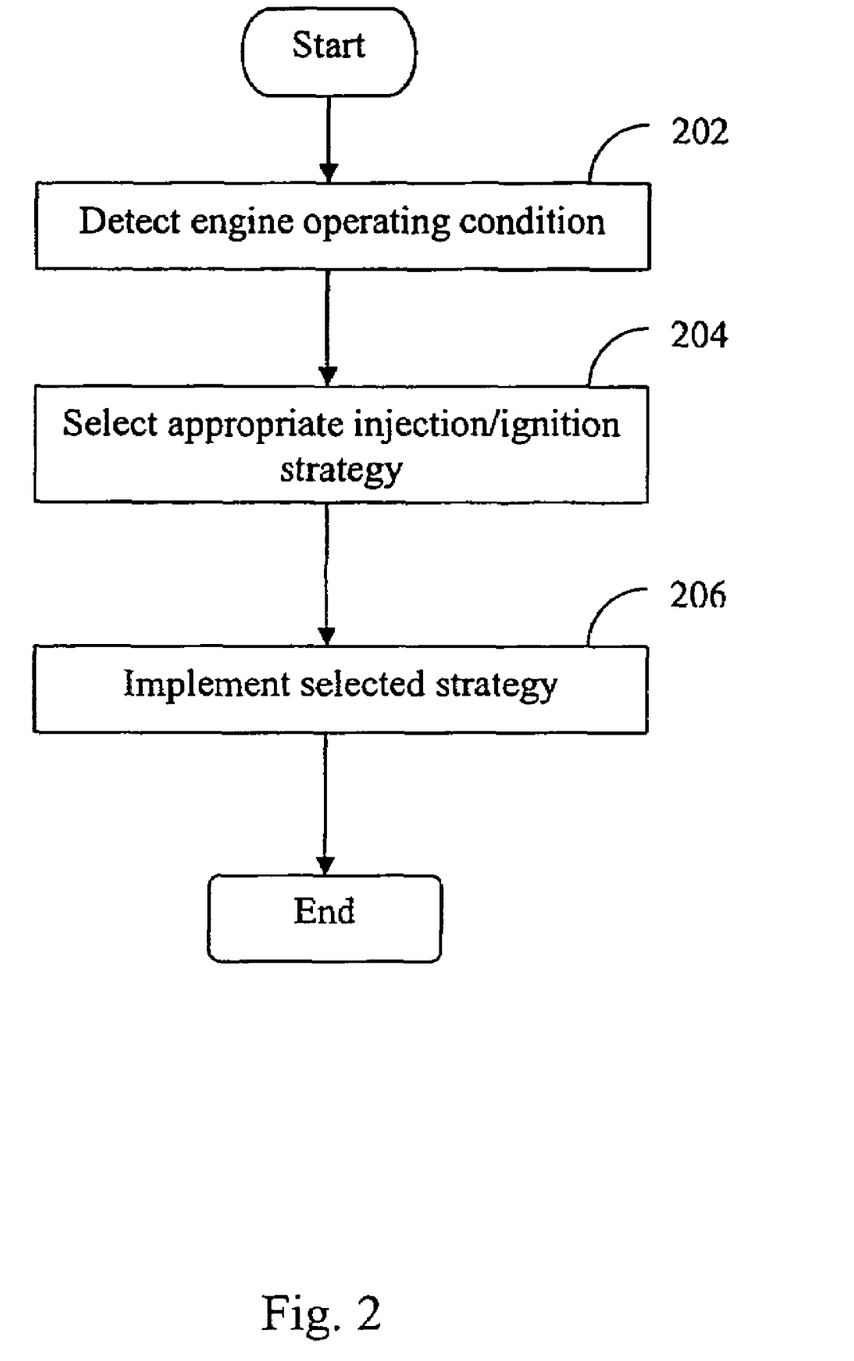
FIG. 2 is a flowchart of an engine operating protocol according to the present disclosure.

FIG. 2 is a flowchart of an engine operating protocol according to the present disclosure. As shown, at 202, the controller detects an engine operating condition. The operating condition may include, without limitation, a temperature reading or combination of temperature readings such as exhaust temperature, ambient temperature, manifold temperature, etc, speed, load, gear ratio, cold start stage, a combination thereof, or the like. Based on this information, at 204, the controller may select an appropriate injection/ignition strategy. At 206, the controller may then command injection(s) and/or ignition(s) at various times during the engine cycle according to the selected strategy. Accordingly, different injection/ignition strategies may be employed based upon different initial operating conditions.

Figure 3:
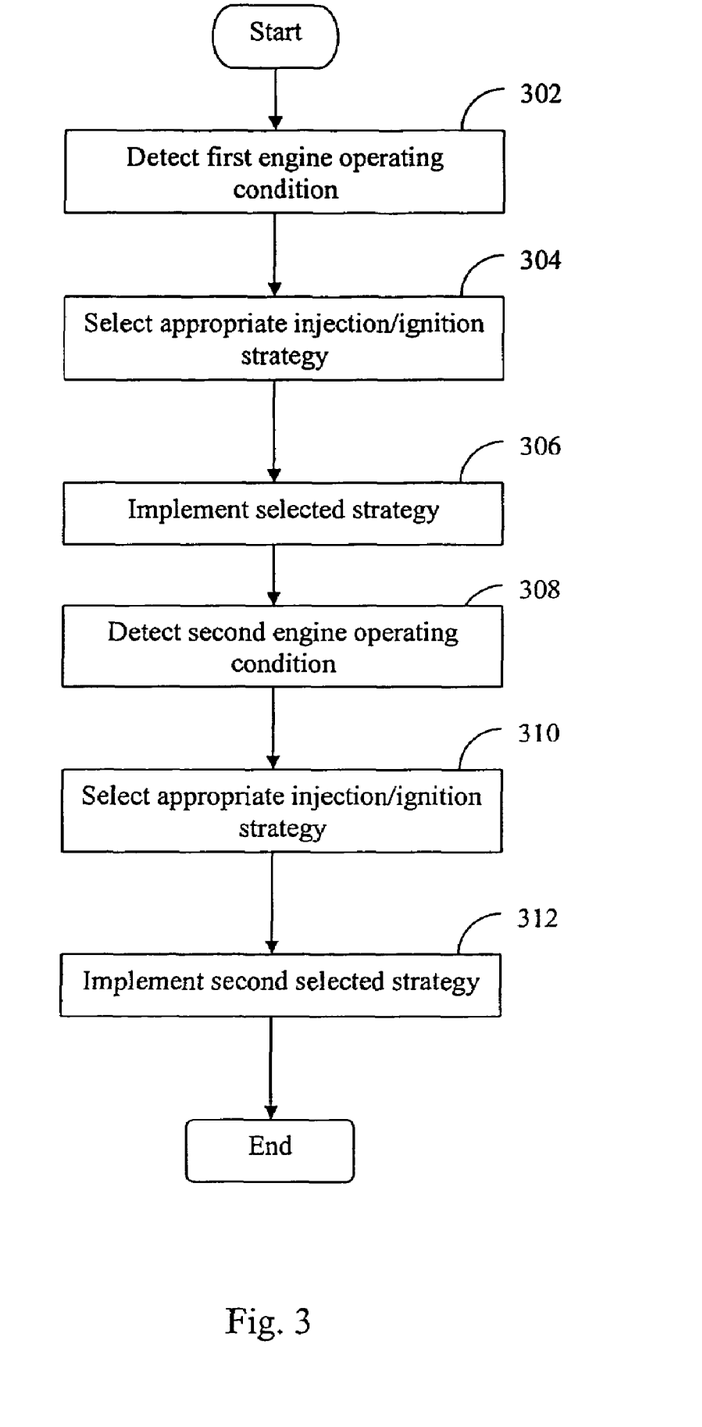
FIG. 3 is a flowchart of another engine operating protocol according to the present disclosure.

As shown in FIG. 3, a given injection/ignition strategy may be altered as operating conditions change. As shown, at 302, the controller detects a first engine operating condition. Based on this information, at 304, the controller selects an appropriate injection/ignition strategy. At 306, the controller commands injection and/or ignition at various times during the engine cycle, thereby implementing the selected strategy. At 308, the controller detects a second operating condition. The second operating condition may be an alteration of the first operating condition. For example, the first operating condition may be a first cold start stage and the second operating condition may be progression into a second cold start stage. Alternatively, the second operating condition may be unrelated to the first operating condition. For example, the first operating condition may be a first cold start stage and the second operating condition may be detection of a given vehicle speed. Based on the second operating condition, the controller selects an appropriate injection/ignition strategy for the second operating condition at 310. The controller implements the second injection/ignition strategy at 312. Thus, an injection/ignition strategy based upon an initial engine operating condition may be adjusted, as appropriate, during operation of the engine. Moreover, it will be appreciated that during operation, engine controller may repeatedly detect current engine conditions and implement an appropriate injection/ignition strategy based on the detected conditions, as needed.

For example, one operating condition that may be detected in order to determine an appropriate injection/ignition strategy is the cold start condition of the engine. In order to detect the cold start condition, engine controller 12 may receive information regarding the engine coolant temperature (ECT), ambient temperature (AT), intake temperature (IT) and exhaust temperature (ET). Engine controller 12 can then determine the timing and number of injections and ignitions that would achieve a desired result. For example, it may be desirable to determine the optimal injection/ignition strategy to obtain maximum port oxidation without compromising combustion stability. As the engines progress from initial cold start up to normal running conditions, engine controller 12 can detect changes in port oxidation and/or other conditions and alter the injection/ignition strategy to achieve the desired result.

Figure 4:
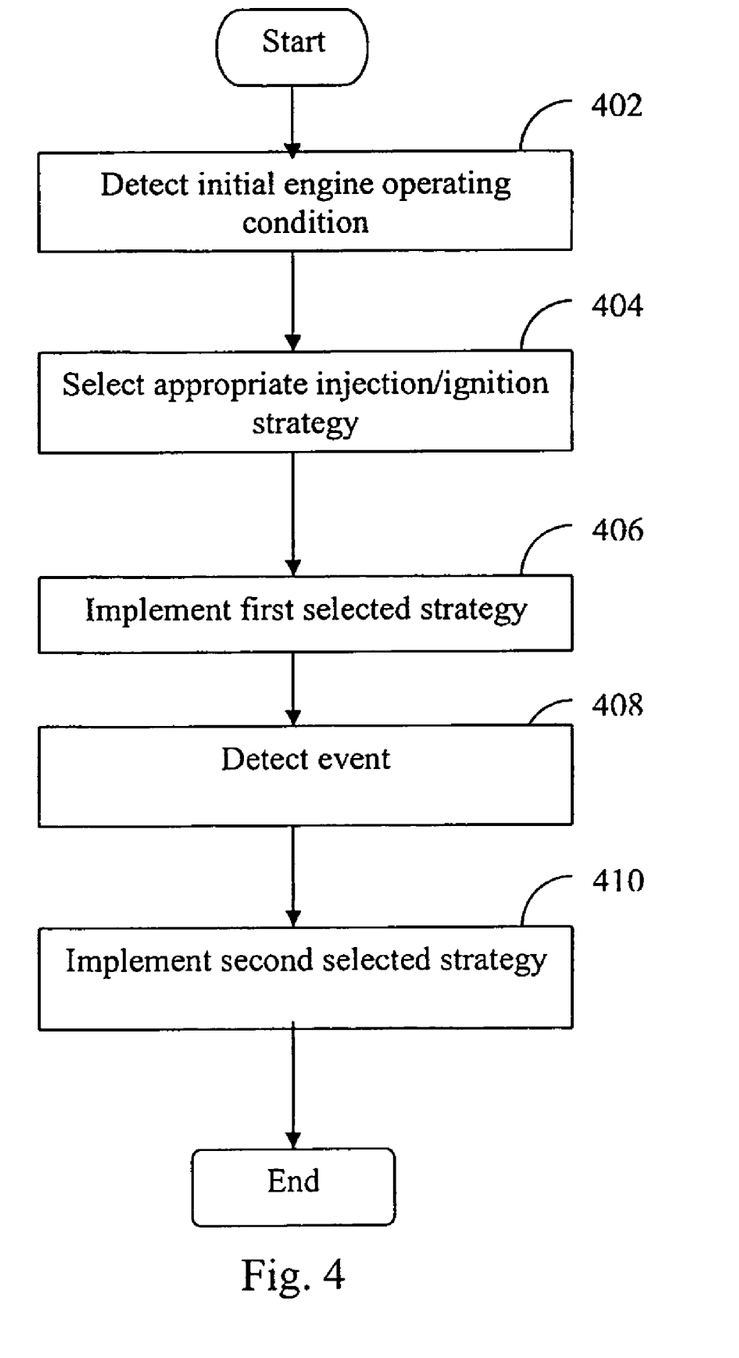
FIG. 4 is a flowchart of yet another engine operating protocol according to the present disclosure.

As shown in FIG. 4, rather than implementing a purely reactive system that is configured only to alter the injection strategy based on detected operating condition changes, the controller may be configured to determine and/or implement an entire injection/ignition protocol sequence based on an initially detected operating condition. As shown at 402, the controller may detect an initial operating condition. Based on this initial operating condition, the controller may determine an injection/ignition protocol 404 including a series of injection strategies. At 406, the controller implements the first injection/ignition strategy in the series. At 408, the controller detects a predetermined event, such as passage of time, number of engine cycles completed, detection of a specific operating condition, etc. At 410, the controller implements the second injection/ignition strategy in the series.

Of course it will be understood that any number of injection strategies may be implemented. Moreover, the controller may be configured to cycle between two or more injection/ignition strategies, as desired. Furthermore, the controller may be configured to implement an injection/ignition protocol that follows a predetermined pattern of injection/ignition strategies and alter this protocol, as needed, based on detected operating conditions.

It should be further understood that different injection/ignition strategies may be employed simultaneously in different cylinders in the engine. For example, a first strategy may be employed in a first or first set of cylinders while a second strategy may be employed in a second or second set of cylinders. Furthermore, the controller may be configured to direct a first or first set of cylinders to follow a predetermined protocol of injection/ignition patterns, while the injection/ignition strategy in a second or second set of cylinders is altered in response to changing operating conditions.

Figure 5:
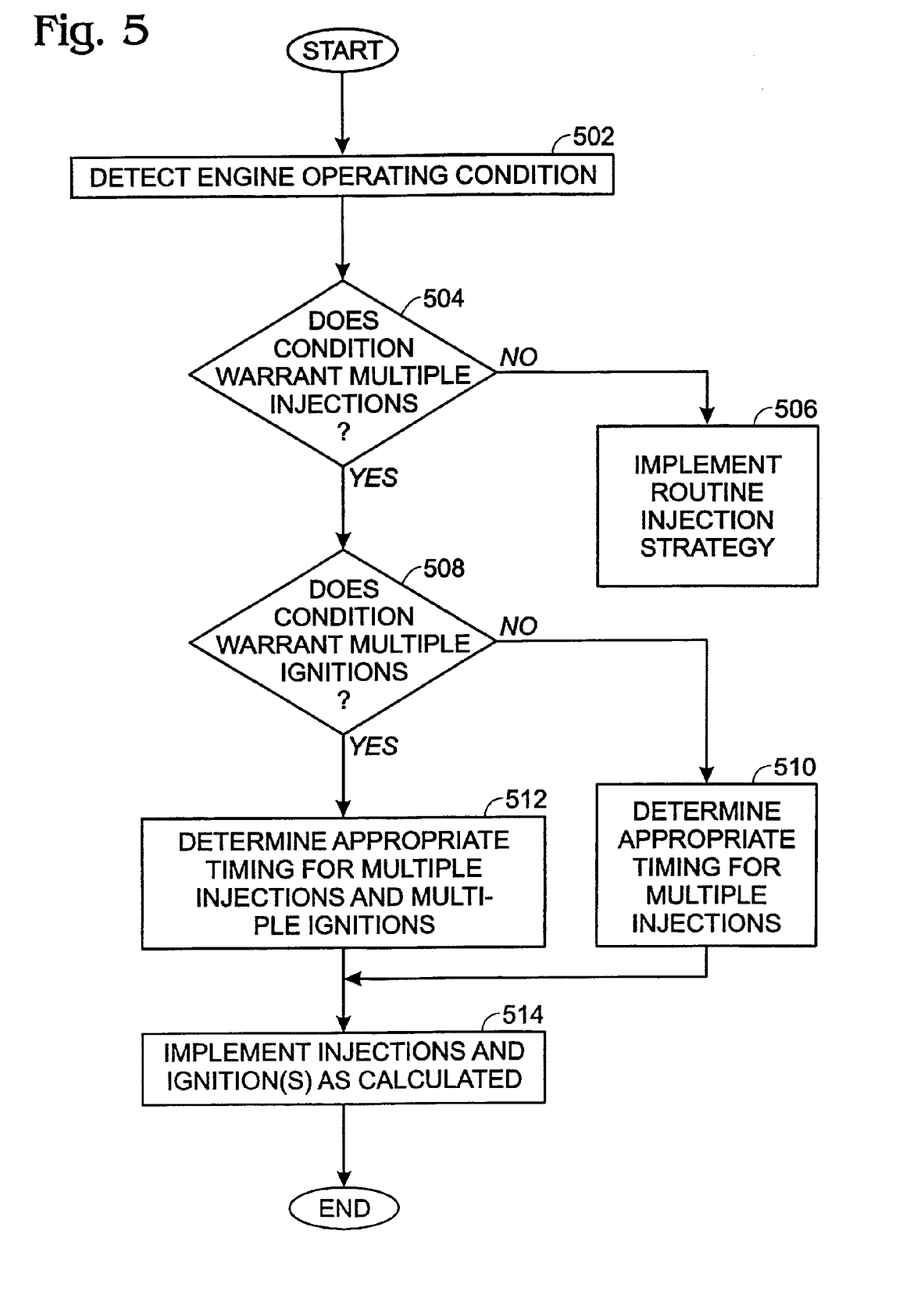
FIG. 5 is a flowchart of an example protocol for selecting injection and ignition operating modes.

FIG. 5 is a flowchart showing the decision making process that may be implemented by a controller utilizing the injection/ignition strategies discussed in the present disclosure. At 502 the controller detects an engine operating condition. At 504, the controller determines whether the detected condition warrants a multiple injection strategy. If no, the controller proceeds to 506 and implements a single injection strategy. If yes, the controller proceeds to 508 and determines if the detected condition warrants a multiple ignition strategy. If no, the controller proceeds to 510 and determines the appropriate timings for the multiple injections. If yes, the controller proceeds to 512 and determines the appropriate timings for the multiple injections and multiple ignitions. Exemplary injection and ignition timings are discussed below with respect to Table I. Once the appropriate injection and ignition timings have been determined, the controller proceeds to 514, and implements the injection and ignition strategy that has been selected for the detected engine condition. In this way, different number of injections and ignitions per cycle may be utilized at different operating conditions, such as cold starting conditions, warmed up conditions, high load, low load, high speed, and low speed conditions.

Table I, below, displays a number of non-limiting injection/ignition timing strategies that may be employed. It will be understood that these strategies are shown for the purposes of discussion only and are not intended to describe the full range of strategies that could be employed.

TABLE 1

Different multi-injection, multi-ignition strategies for DISI engines

| Intake | Compression | Expansion | Exhaust |
|--------|-------------|-----------|---------|
| IJ     | IJ          | IG        |         |
| IJ     | IJ IG       | IG        |         |
| IJ     | IG          | IN        | IG      |
|        | IJ          | IG IN     | IG      |

IJ = injection
IG—ignition

As shown in Table I, a first exemplary injection/ignition strategy employs multiple injections and a single ignition. In this example, the injections take place during the intake and compression strokes, while the ignition takes place during the expansion stroke. As shown, the first injection occurs at approximately 90° ATDC during the intake stroke. The second injection takes place at approximately 180° BTDC during the compression stroke. Finally, a single ignition occurs at approximately 90° ATDC during the expansion stroke. Thus, in this example, multiple separate injections are followed by a single ignition. Such an approach may be advantageously used to improve ignitability of the mixture formed by the first injection by forming a small richer mixture that can be ignited by the spark plug, such as with fuels having lower volatility, for example.

A second exemplary injection/ignition strategy utilizes multiple injections and multiple ignitions. In this example, the injections again take place during the intake and compression strokes, while the ignitions take place during the compression and expansion strokes. As shown, a first injection occurs at approximately 135° ATDC during the intake stroke and a second injection occurs at approximately 180° BTDC during the compression stroke. A first ignition occurs at approximately 90° BTDC during the compression stroke, and a second ignition occurs approximately 160° ATDC during the expansion stroke. Thus, in this example, multiple injections are followed by multiple ignitions. Such an approach may be used to improve complete combustion, for example.

A third exemplary injection/ignitions strategy also utilizes multiple injections and multiple ignitions. However, in this example the injections take place during the intake and expansion strokes while the ignitions take place during the compression and exhaust strokes. As shown, a first injection occurs at approximately 160° ATDC during the intake stroke. A first ignition takes place at approximately 45° BTDC during the compression stroke. A second injection then occurs at approximately 45° BBDC during the expansion stroke. A second ignition then occurs at approximately 160° ABDC during the exhaust stroke. Thus, in this example, injections and ignitions are alternated.

A fourth exemplary injection/ignitions strategy also utilizes multiple injections and multiple ignitions. However, in this example the injections take place during the compression and expansion strokes while the ignitions take place during the expansion and exhaust strokes. As shown, a first injection occurs at approximately 135° BTDC during the compression stroke. A first ignition takes place at approximately 45° ATDC during the expansion stroke. A second injection then occurs at approximately 45° BBDC during the expansion stroke. A second ignition then occurs at approximately 180° ABDC during the exhaust stroke. Thus, in this example, injections and ignitions are alternated and weighted towards the second half of the four-stroke cycle.

Each of the third and four examples may be used to generate exhaust gas heat by late combustion, while still generating combustion torque via the first injection. Further, selection between the third and fourth examples may be based on engine speed, burn duration, etc., to improve fuel economy under different conditions.

It will be understood that these strategies are shown simply as examples of what could be done and should not be considered limiting in any sense. According to the present disclosure, an injection and/or ignition could take place at any time during any stroke. For example, while not shown in Table I, an exhaust stroke injection followed by an exhaust stroke ignition may be employed to enhance port oxidation and promote fast light-off. Moreover, the precise timings indicated above, i.e. degrees ATDC, ABDC, BTDC or BBDC are provided solely for ease of discussion and as examples of potential timing strategies and should not be considered limiting in any sense. Thus, while a given injection or ignition may be described as taking place, for example, at approximately 135° BTDC during the compression stroke, it should be understood that the specific timing of an injection or ignition during the stroke will depend on numerous factors including the desires of the user and the intended outcome.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine having a four-stroke cycle including an intake stroke, a compression stroke, an expansion stroke, and an exhaust stroke, the method comprising:
during a first operating condition, performing multiple ignitions during a first single cycle, wherein a first ignition takes place during a first stroke in the cycle and a second ignition takes place during a second stroke in the cycle; and
during a second operating condition, performing multiple ignitions during a second single cycle, wherein a first ignition takes place during a first stroke in the cycle and a second ignition takes place during a second stroke in the cycle, where at least one of said first and second strokes of said first cycle are a different stroke than at least one of said first and second strokes of said second cycle.

2. The method of claim 1 wherein said first stroke of said first cycle is a different stroke than said first stroke of said second cycle.

3. The method of claim 1 wherein said second stroke of said first cycle is a different stroke than said second stroke of said second cycle.

4. A method for operating an engine having a four-stroke cycle including an intake stroke, a compression stroke, an expansion stroke, and an exhaust stroke, the method comprising:
generating exhaust gas heat during a cold start condition via port oxidation of a second injection and generating combustion torque via a first injection, the generating including:
during a first operating condition, operating in a first mode including performing the first injection during an intake stroke of a first cycle, performing a first ignition during a compression stroke of the first cycle, performing the second injection during an expansion stroke of the first cycle, and performing a second ignition during an exhaust stroke of the first cycle; and
during a second operating condition, operating in a second mode including performing a first injection during a compression stroke of a second cycle, performing a first ignition during an expansion stroke of the second cycle, performing a second injection during the expansion stroke of the second cycle, and performing a second ignition during an exhaust stroke of the second cycle.

5. The method of claim 4 further comprising selecting from among the first and second mode based on engine speed.

6. The method of claim 5 further comprising, during a third operating condition, operating in a third mode including performing a first injection during an intake stroke of a third cycle, performing a second injection during a compression stroke of the third cycle, and performing a single ignition during an expansion stroke of the third cycle, the third operating condition selected based on fuel volatility.

7. The method of claim 5 further comprising, during a fourth operating condition, operating in a fourth mode including performing a first injection during an intake stroke of a fourth cycle, performing a second injection during a compression stroke of the fourth cycle, and performing a first ignition during the compression stroke of the fourth cycle, and performing a second ignition during the fourth cycle, the second ignition of the fourth cycle after the first ignition of the fourth cycle.

8. The method of claim 7 wherein the second ignition of the fourth cycle occurs during an expansion stroke of the fourth cycle.

9. A method for operating an engine having a four-stroke cycle including an intake stroke, a compression stroke, an expansion stroke, and an exhaust stroke, the method comprising:
during a first operating condition, operating in a first mode including performing, in order, a first injection, a first ignition, a second injection, and a second ignition, with each of the injections and ignitions of the first mode occurring during a first, common, four-stroke combustion cycle; and
during a second operating condition, operating in a second mode including performing, in order, a first injection, a second injection, a first ignition, and a second ignition, with each of the injections and ignitions of the second mode occurring during a second, common, four-stroke combustion cycle.

10. The method of claim 9 wherein, in the first mode, the first injection occurs during an intake stroke of the first cycle, and the second injection occurs during an expansion stroke of the first cycle.

11. The method of claim 9 wherein, in the first mode, the first injection occurs during a compression stroke of the first cycle, and the second injection occurs during an exhaust stroke of the first cycle.

12. The method of claim 9 wherein, in the first mode, the first ignition occurs during a compression stroke of the first cycle, and the second ignition occurs during an exhaust stroke of the first cycle.

13. The method of claim 9 wherein, in the first mode, the first ignition occurs during an expansion stroke of the first cycle, and the second ignition occurs during an exhaust stroke of the first cycle.

14. The method of claim 9 wherein, in the second mode, the first injection occurs during an intake stroke of the second cycle, and the second injection occurs during a compression stroke of the second cycle.

15. The method of claim 9 wherein, in the second mode, the first ignition occurs during a compression stroke of the second cycle, and the second ignition occurs during an expansion stroke of the second cycle.

\* \* \* \* \*